United States Patent
Wait, Jr.

[15] 3,670,808
[45] June 20, 1972

[54] HEATING AND AIR-CONDITIONING SYSTEM FOR CONSTRUCTION EQUIPMENT

[72] Inventor: John D. Wait, Jr., Peoria, Ill.
[73] Assignee: Caterpillar Tractor Co., Peoria, Ill.
[22] Filed: Feb. 9, 1970
[21] Appl. No.: 9,583

[52] U.S. Cl. .................... 165/42, 62/173, 62/244, 62/428
[51] Int. Cl. .................................................. B60h 3/00
[58] Field of Search ............... 62/173, 428, 19.6, 244; 165/42, 43

[56] References Cited
UNITED STATES PATENTS

| | | |
|---|---|---|
| 2,376,859 | 5/1945 | Benn .................................. 62/428 |
| 3,183,962 | 5/1965 | Steinhagen ......................... 165/42 |
| 3,421,576 | 1/1969 | Rozne ................................. 165/42 |

Primary Examiner—Meyer Perlin
Attorney—Fryer, Tjensvold, Feix, Phillips & Lempio

[57] ABSTRACT

A combined heating and air-conditioning system is provided with a heater coil and evaporator coil located back to back in a single housing enabling the use of common controls and common duct system for both heating and cooling. The heater coil is placed ahead of the evaporator coil in the air flow so that air may be heated and dehumidified on cool, humid days and warm air from the heater may be used to prevent the evaporator coil from frosting over.

5 Claims, 5 Drawing Figures

INVENTOR
JOHN D. WAIT, JR.

BY
ATTORNEYS

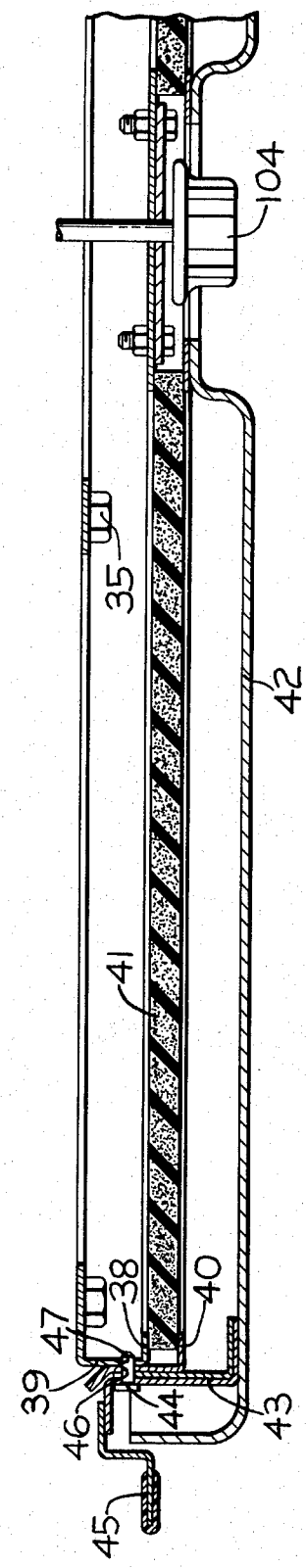

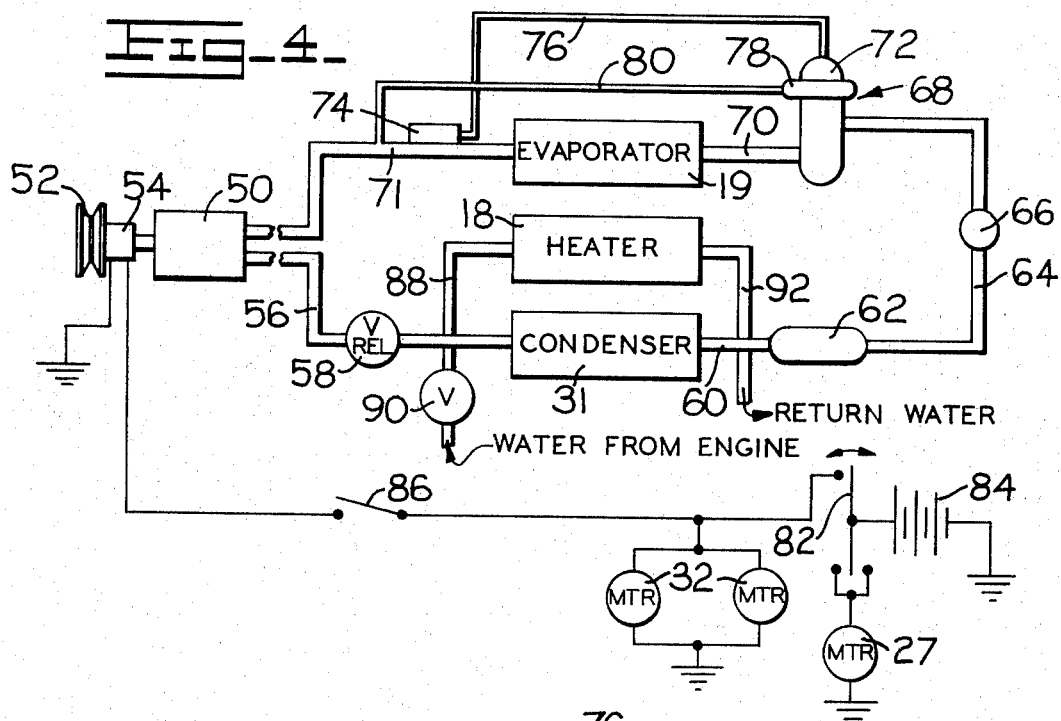
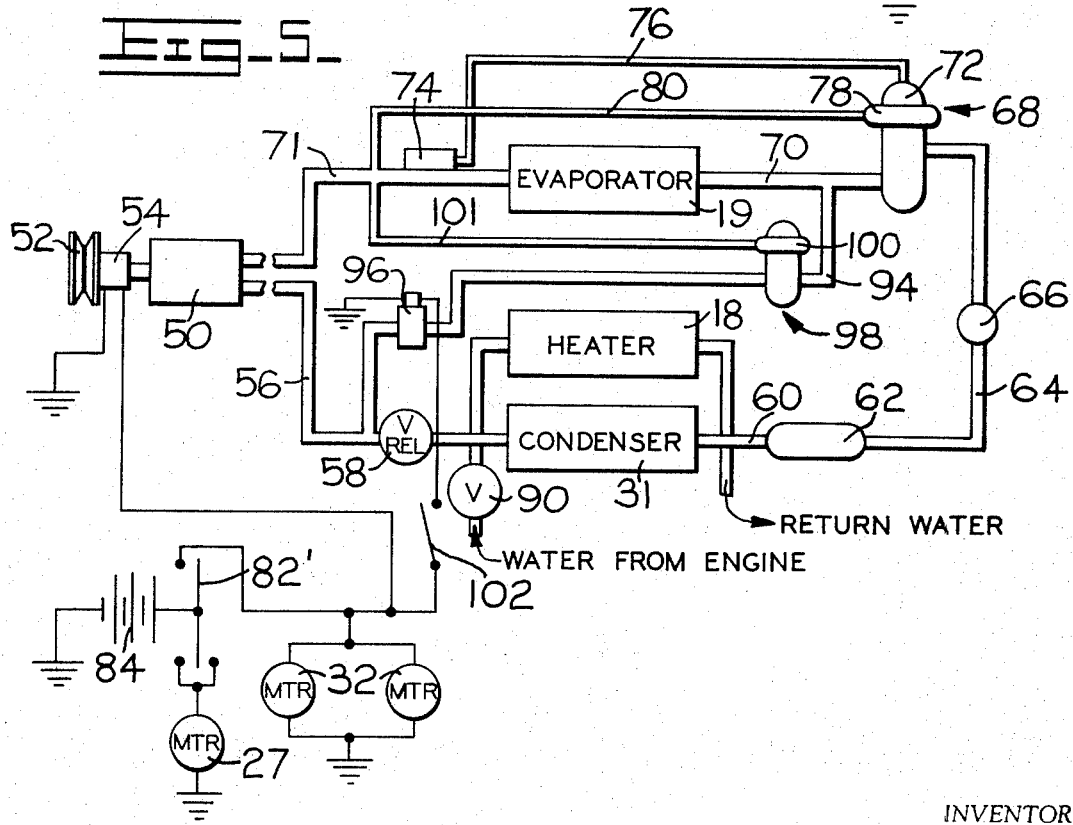

HEATING AND AIR-CONDITIONING SYSTEM FOR CONSTRUCTION EQUIPMENT

BACKGROUND OF THE INVENTION

The present invention relates to environmental control systems for motor vehicles and the like, and pertains more particularly to a combined heating air-conditioning system for motor vehicles in the earthmoving industry.

Severe climatic conditions often hamper earthworking and earthmoving operations. Much of such interference is due to the effect of such conditions on the operator of earthworking machinery. For this reason the recent trend in the earthmoving industry is to provide environmental control cabs in many of the earthmoving vehicles to permit operation in all types of weather and improve the comfort and efficiency of the operator. Heretofore the equipment manufacturer has generally supplied the heater while completely separate air-conditioning units were supplied by other manufacturers who specialize in such equipment. This results in a duplication of controls, motors and fans and increases the overall cost of providing heating and air conditioning to the vehicle. Such multiple units also consume valuable space in and around the chassis of the vehicle.

SUMMARY OF THE INVENTION

Accordingly it is the primary object of the present invention to overcome the above objections of the prior art by providing a system that incorporates both heating and cooling in one system to control the temperature and humidity in the cab of an earthmoving motor vehicle.

In accordance with a primary aspect of the present invention the heating coils and cooling coils for controlling the temperature and humidity of the air in the cab of a vehicle are placed in the same housing and a common air circulating system is used so that duplicate controls and duct systems are eliminated.

In accordance with another aspect of the present invention the heater coil is located in front of the cooling coil in the air flow system to provide an alternate method of controlling the air temperature and humidity and also to provide means for preventing icing of the cooling coils.

BRIEF DESCRIPTION OF THE DRAWINGS

The above and other objects and advantages of the present invention will become apparent from the following specification when read in conjunction with the accompanying drawings in which:

FIG. 3 is a fragmentary elevational view in section of the filter of the present invention taken along lines III—III of FIG. 2;

FIG. 4 is a schematic diagram of a first embodiment of the heating and cooling circulating systems and the control system for the subject invention;

FIG. 5 is a schematic diagram of an alternate embodiment of the heating and cooling circulating systems and a control system therefor.

DETAILED DESCRIPTION OF THE DRAWINGS

Figure 1:
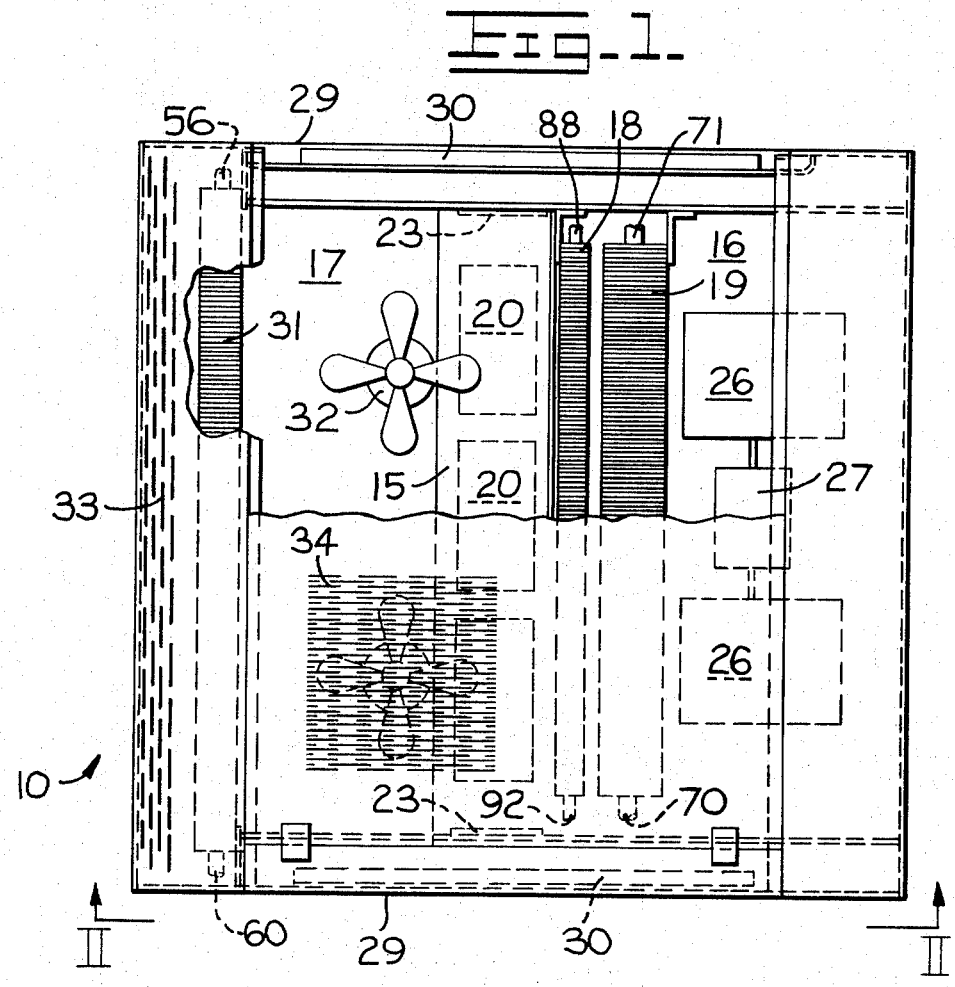
FIG. 1 is a schematic plan view of the system of the present invention.
Figure 2:
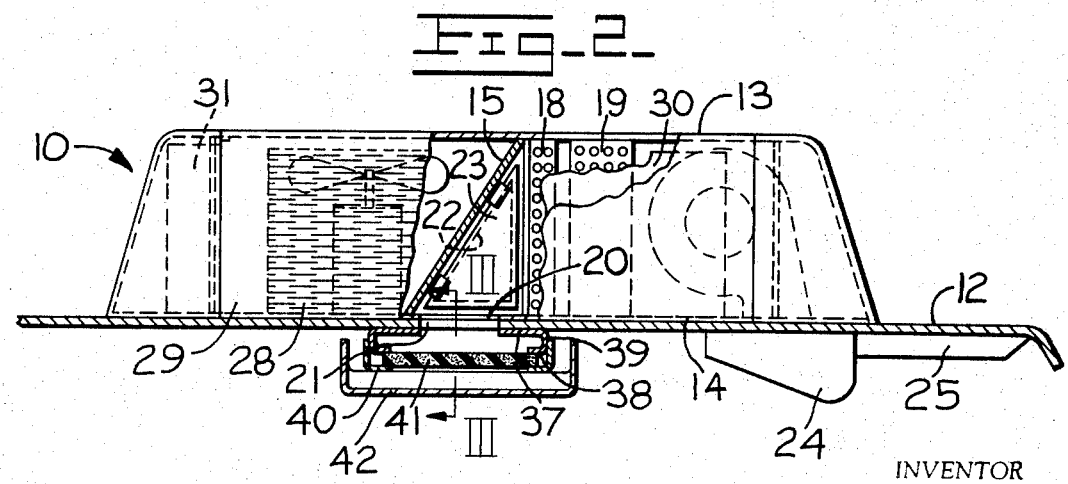
FIG. 2 is a partially sectioned schematic elevational view of the system viewed generally along lines II—II of FIG. 1.

Referring now to the drawings, and more particularly to FIGS. 1 and 2, there is illustrated a preferred embodiment of the main air-conditioning unit generally designated by the numeral 10 shown mounted on the roof 12 of a tractor cab or other construction or earthworking machinery. The cab of the vehicle normally forms a closed, or at least encloseable, operator compartment in which the operator normally sits to manipulate the controls of the vehicle or equipment. The main air-conditioning unit 10, although illustrated as being preferably mounted on the roof of the vehicle cab, may optionally be mounted at other positions such as the side or the rear of the operator compartment. The term "air-conditioning" is used herein in its broadest sense to mean the treatment of air in any manner, such as heating, cooling, dehumidifying, or filtering, or any combination of these. The main air-conditioning unit 10 comprises a housing 13 enclosed by a bottom wall 14 and divided by a means of an intermediate sloping wall 15 into a forward compartment 16 and a rear compartment 17. The forward compartment 16 may be referred to as an air-conditioning or air treatment chamber and contains a heater coil 18 and a cooler or evaporator coil 19. The heater coil 18 is connected to a heat source such as to a conventional liquid coolant circulating system wherein heated coolant such as water from the engine block is directed therethrough.

The cooling coil 19 is the evaporator coil of a conventional refrigeration system as will be more fully explained later.

A plurality of inlet openings 20 formed in bottom wall 14 cooperate with openings 21 in roof 12 to admit air from the operator compartment into chamber 16. Other inlet openings 22 provided with closure means 23 are provided for admitting outside air into chamber 16. An opening or plurality of openings (not shown) are provided at the forward end of the chamber 16 for discharging into conventional distributor ducts (not shown) housed in console 24 and defroster duct 25. A pair of blowers 26 driven by a motor 27 are provided for forcing air through the air-conditioning chamber 16. Outside air enters the unit through a grill 28 in side covers 29 and passes through filters 30 and through inlet openings 22 into chamber 16 where it is mixed with recirculated air entering through inlet openings 20 as it passes through the chamber 16.

The rear chamber 17 contains a condenser coil 31 of the refrigerating system and a pair of fans 32. The fans 32 draw outside air through a grill 33 at the rear of the housing 13 which flows through the condensor coil 31 for cooling, and is then discharged through grills 34 on the top cover. The fans 32 may be thermostatically controlled so as to force air through condensor coil 31 only when needed for the cooling thereof. When the air-conditioning unit 10 is mounted on a relatively high speed vehicle it is preferably mounted such that grill 33 faces forward so that cool air as a result of movement of the vehicle may pass through condensor coil 31 for cooling.

In order to obtain maximum heating or cooling, the air within the operator compartment is recirculated through the air-conditioning chamber. The recirculated air is filtered before entering the inlet openings 20 passing through the air-conditioning chamber 16 and being discharged through the duct systems 24 and 25.

The filter arrangement (FIGS. 2 and 3) comprises a support bracket having an attachment flange 37 adapted to fit around inlet openings 21 in roof 12 and be attached thereto in any well known manner, such as by bolts or screws 35. A spacer flange 38 is supported in spaced relation to the attachment flange 37 by means of side walls 39. A filter holder 40 is adapted to engage the periphery 39 of the support bracket and hold a filter element 41 into engagement with spacer flange 38. The filter holder 40 and a dust pan 42, which may be formed as a unit, are held in place by releasable attaching means. The attaching means comprises a plurality of spring clips, each of which comprises a spring clip 43 attached to dust pan 42 and carrying a pin 44 and a lever or handle 45. The pin 44 is biased by means of spring 43 into cooperative engagement with aligned holes or detent means 46 and 47 in holder 40 and bracket side wall 39 respectively. To remove the filter arrangement, the operator supports the tray 42 with the heel of his hands and pulls downward on the lever 45 with his fingers. The levers being attached to spring clips 43 disengage the pins 44 from the bracket 39, thereby allowing the tray and filter to be removed as a unit. The tray catches any dirt or dust jarred loose from the filter so that it does not fall on the operator. The filter can then be easily removed from the tray for cleaning or replacing. Since the filters are located above the operator, the tray serves another function by catching the dirt or dust jarred from the filter when the tractor is operating on rough terrain.

A partial schematic diagram of the heating circuit, a schematic diagram of the cooling or refrigeration circuit, and the schematic wiring diagram of the electrical controls therefor are illustrated in FIG. 4. Referring now to FIG. 4, a refrigerant compressor 50 is arranged to be driven by a vehicle engine, not shown, through a drive pulley 52. The drive pulley 52 is coupled through an electrically actuated magnetic clutch 54 to the refrigerant compressor 50. The high pressure side of the compressor 50 is connected by a conduit 56 through a pressure relief valve 58 to the condensor 31. From the condensor 31 a conduit 60 delivers refrigerant to a combination filter, receiver, drier 62 and a conduit 64 then delivers from the drier through a sight glass 66 to a thermostatically controlled expansion valve 68. From the expansion valve 68 the fluid is then delivered through a conduit 70 to the inlet side of the evaporator 19. A return or low pressure conduit 71 then returns the fluid from evaporator 19 back to the low side of the compressor 50. A temperature sensing control 72 of valve 68 is actuated in response to temperature as by sensing device 74 connected thereto by control tube 76. A pressure responsive control 78 is connected by a conduit or tube 80 to the low pressure return conduit 71.

To operate the air-conditioning system illustrated in Fig. 4, a rotary switch schematically shown at 82 is rotated counterclockwise to complete the electrical circuit from a battery 84 to the blower fan motor 27, condensor fan motors 32 and to an adjustable thermostatic switch 86. With the switch 82 in this position the motors 27 and 32 will run continuously. If the temperature in the operator compartment is above the setting of the thermostatic switch 86, it will close, thereby energizing the magnetic clutch 54 causing the compressor 50 to be driven by the vehicle engine. When the temperature drops below the setting of the thermostatic switch 86, it will open to de-energize the magnetic clutch 54 to disconnect the compressor 50 from the engine. Thus the temperature of the evaporator 19, which controls the temperature by cooling of the air stream flowing through the chamber 16, is determined by the operation of the compressor 50 which is controlled by magnetic clutch 54 controlled by thermostatic switch 86.

Rotating the switch 82 to the off position breaks the electrical circuit to the motors 27 and 32 and clutch 54 and shuts off the cooling portion of the air-conditioning system. The switch 82 will preferably have a plurality of positions to provide a plurality of speeds for the fan motor 27.

Hot water from the engine cooling system is supplied through a conduit 88 having a manually adjustable valve 90 to the heater coil 18 and returned by means of a conduit 92 to the engine cooling system. In order to operate the heater the rotary switch 82 is rotated in the clockwise direction to complete a circuit from battery 84 to blower motor 27. The flow of hot water from the engine cooling system through heater coil 18 is controlled by manual valve 90 to control the temperature of heater coil 18 and thus the flow of air flowing through the chamber 16.

With the system shown in FIG. 4, on hot days the air cooling system is operated independently as described above of the heating system. Likewise, on cold days the heaters operate independently from the air cooler. However, on cool, humid days to provide maximum operator comfort, both the heater and air-conditioning systems are operated simultaneously to dehumidify and heat the air. For this mode of operation, the switch 82 is rotated counterclockwise to energize the motors 27 and 32 and the thermostatic switch 86 is set to its lowest or coldest position so that the compressor will run continuously. The manual valve of the heater system 90 is then opened to direct hot water through the heater coil 18. The compartment temperature is controlled by manually adjusting a valve 90 to control the flow of water through the heater coil 18.

An alternate method of controlling the temperature of the refrigerant circuit is illustrated in FIG. 5. Components of the system of FIG. 5, which are identical to those of FIG. 4, are indicated by corresponding reference numerals. In addition to the components of FIG. 4, the FIG. 5 system includes a by-pass conduit 94 connected between the conduit 56 and the conduit 70. This conduit 94 passes hot compressed refrigerant gas from the high pressure side of the compressor 50 directly to the evaporator 19, thus bypassing the condensor 31 and expansion valve 68. The flow of gas through conduit 94 is controlled by a means of a temperature controlled solenoid actuated valve 96 and a pressure responsive valve 98. A pressure sensing control 100 for valve 98 is connected to the low pressure conduit 71 by means of a tube or conduit 101. With this system, operating the air-conditioner is initiated by rotating the switch 82' counterclockwise to complete the electrical circuit to the motors 27 and 32, magnetic clutch 54 and to an adjustable thermostatic switch 102. With this control system, the compressor runs continuously and the temperature is controlled by passing hot gas from the compressor to the inlet side of the evaporator 19 in response to a signal from the thermostatic switch 102. If the temperature of the compartment is above the setting of the switch 102, it will be opened and a solenoid valve will be closed, thereby blocking the flow of hot refrigerant gas through the conduit 94 and the refrigeration system functions normally. However, if the temperature in the operator compartment drops below the thermostat setting, the switch 102 will close to energize the solenoid valve 96 causing it to shift to the open position and allow hot refrigerant gas to pass therethrough to the pressure responsive bypass valve 98 and to the inlet side of the evaporator 19. This high temperature gas at high pressure mixes instantly with gas already in the evaporator 19, instantly slowing, or reversing further heat absorption (i.e., cooling) by the evaporator 19. Thus, the control of hot refrigerant gas through the bypass circuit or conduit 94 is both temperature and pressure responsive, and provides a control system that is instantly responsive to maintain the temperature of air flowing past the evaporator coil 19 relatively constant.

The control knobs and switches for the above system are preferably mounted in a convenient place for the operator, such as in a recessed portion (not shown) of console 24. Also, the flow of air through outlet ducts (not shown) which are housed in console 24 is controlled by flapper valves in a manner well known in the art to permit the operator to direct the air stream on himself or through the defroster duct 25 to the windshield, or in a combination of both. A control knob 104, shown in FIG. 3, is connected by conventional linkage (not shown) to closures 23 for controlling the amount of outside air admitted into the chamber 16.

The present unit can also be used as a pressurizer wherein the closure means or doors 23 are opened to allow outside air to be drawn in to chamber 16 and forced by means of blowers 26 into the operator compartment to create a slight pressure therein. This pressure prevents dust and like materials from being sucked into the operator compartment and aids in keeping the operator compartment free of such dust and foreign particles. The pressurizer mode can be used with either the air-conditioning or the heating mode or independently thereof.

What is claimed is:

1. An air-conditioning system for a vehicle having an enclosed operator compartment, said system comprising:
   a housing adapted to be attached to said compartment;
   said housing having an air treatment chamber;
   a blower mounted in said housing and adapted to force a flow of air through said air treatment chamber;
   said air treatment chamber including a plurality of air inlet openings at one end of said chamber and at least an air outlet opening at the other end of said chamber;
   at least one of said inlet openings communicating with the interior of said compartment for recirculating air from the interior of said compartment through said chamber;
   another of said inlet openings communicating with the atmosphere exterior of said compartment for admitting outside air into said chamber;

an air cooling coil positioned in said chamber in the path of said flow of air;

an air heating coil positioned in said chamber in said flow of air;

said coils being so positioned in said chamber that said air flow from said inlet openings pass through said heating coil first and must pass through both of said coils to said outlet openings;

a first circuit including a source of fluid for circulation through said cooling coil to transfer heat therefrom; and, a second circuit operative for supplying a fluid from a second diverse source for circulation through said heating coil to supply heat thereto.

2. The invention of claim 1 wherein said second source comprises cooling fluid from the cooling system of an engine of said vehicle.

3. An air-conditioning system for an earthmoving vehicle having an enclosed operator compartment, said system comprising:

a housing adapted to be attached to said compartment;

said housing having an air treatment chamber;

a blower mounted in said housing and adapted to force a flow of air through said air treatment chamber;

said air treatment chamber including a plurality of air inlet openings at one end of said chamber and at least an air outlet opening at the other end of said chamber;

at least one of said inlet openings communicating with the interior of said compartment for recirculating air from the interior of said compartment through said chamber;

another of said inlet openings communicating with the atmosphere exterior of said compartment for admitting outside air into said chamber;

an air cooling coil positioned in said chamber in the path of said flow of air;

an air heating coil positioned in said chamber in said flow of air;

said coils being so positioned in said chamber that said air flow from said inlet openings must pass through both of said coils to said outlet opening;

refrigerant circuit means for circulating refrigerant between a compressor and said cooling coil;

said refrigerant circuit including a condenser in said circuit before said cooling coil;

a bypass circuit for bypassing said condenser in said refrigerant circuit, and passing hot gas from said compressor to the inlet side of said cooling coil;

temperature responsive valve means for controlling the flow of gas through said bypass circuit; and, pressure responsive valve means for controlling the flow of gas into said cooling coil.

4. The system of claim 3 wherein said heating coil is positioned ahead of said cooling coil in said air flow path.

5. An air-conditioning system for a vehicle having an enclosed operator compartment, said system comprising:

a housing adapted to be attached to said compartment;

said housing having an air treatment chamber;

a blower mounted in said housing and adapted to force a flow of air through said air treatment chamber;

said air treatment chamber including a plurality of air inlet openings at one end of said chamber and at least an air outlet opening at the other end of said chamber;

at least one of said inlet openings communicating with the interior of said compartment for recirculating air from the interior of said compartment through said chamber;

another of said inlet openings communicating with the atmosphere exterior of said compartment for admitting outside air into said chamber;

an air cooling coil positioned in said chamber in the path of said flow of air;

an air heating coil positioned in said chamber in said flow of air;

said coils being so positioned in said chamber that said air flow from said inlet openings pass through said heating coil first and must pass through both of said coils to said outlet openings;

independently operable heating and cooling circuits for controlling said cooling coil and said heating coil so that said circuits can be operated simultaneously;

said cooling circuit comprises a refrigerant circuit having a compressor, a condenser, and a cooling coil;

temperature responsive means for bypassing said condenser to direct gas from said compressor directly to the inlet side of said cooling coil.

* * * * *